United States Patent [19]
Iwata

[11] 4,229,092
[45] Oct. 21, 1980

[54] DISTANCE INDICATOR FOR CAMERA

[75] Inventor: Hiroshi Iwata, Osaka, Japan

[73] Assignee: West Electric Company, Ltd., Osaka, Japan

[21] Appl. No.: 28,174

[22] Filed: Apr. 9, 1979

Related U.S. Application Data

[63] Continuation of Ser. No. 804,808, Jun. 8, 1977, abandoned.

[30] Foreign Application Priority Data

Jun. 17, 1976 [JP] Japan .................................. 51-71955

[51] Int. Cl.³ .......................... G03B 3/00; G03B 17/20
[52] U.S. Cl. ...................................... 354/198; 354/289
[58] Field of Search ............... 354/53, 60 L, 195, 198, 354/199, 219, 224, 225, 289; 352/170, 171

[56] References Cited

U.S. PATENT DOCUMENTS

| 3,393,622 | 7/1968 | Schottle et al. ........................ 354/198 |
| 3,677,619 | 7/1972 | Mackenzie ........................ 354/289 X |
| 3,947,860 | 3/1976 | Imai et al. ............................. 354/195 |
| 4,011,571 | 3/1977 | Okuzawa ........................ 354/198 X |

FOREIGN PATENT DOCUMENTS 1447564  1/1969  Fed. Rep. of Germany ........... 354/198

Primary Examiner—Michael L. Gellner
Attorney, Agent, or Firm—Cushman, Darby & Cushman

[57] ABSTRACT

A distance indication arrangement for a photographic camera includes a plate having a plurality of numerals or symbolic marks thereon representing distances from the camera to the object being photographed. A multi-position switch is provided which is operable independently of the shutter releasing mechanism of the camera to selectively feed current to illumination elements associated with the numerals or marks. In accordance with the position of the switch, an individual numeral or mark is illuminated.

19 Claims, 9 Drawing Figures

DISTANCE INDICATOR FOR CAMERA

This is a continuation of application Ser. No. 804,808 filed June 8, 1977, now abandoned.

BACKGROUND OF THE INVENTION

This invention relates to a distance indication means for photographic cameras.

Hitherto, as the focussing adjustment scheme, some photographic cameras utilize so-called zone-focussing method in which, instead of continuous focussing adjustment, the focussing adjustment is performed by setting the main lens for several discrete object distances represented by numerals or symbolic marks.

The zone-focussing method has an advantage in easiness of the focussing adjustment compared with the continuous focussing adjustment. However, since the focussing adjustment is performed according to the distance indications represented by numerals or symbolic marks corresponding to object distances, in case that a plurality of indications are arranged successively with close spacings, the zone-focussing method has also a disadvantage which causes such as eventual failure in focussing adjustment due to errorneous recognition of the indications or difficulties in the recognition of these indications in the dark place, resulting in failures in the photographing.

This invention purports to eliminate the foregoing disadvantage and provide a distance indication means in which only one relevant numeral or symbolic mark corresponding to the objective distance is indicated by illumination.

DETAILED EXPLANATION OF THE INVENTION

Figure 1:
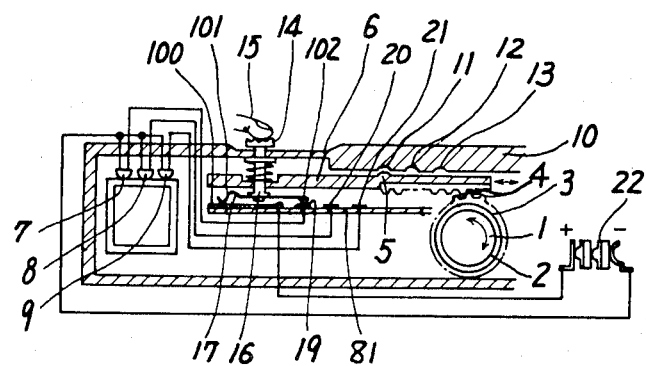
FIG. 1 is a sectional front view of a main port of a first example of the distance indicator embodying the present invention which is applied to a photographic camera.

In the following, the present invention will be explained in detail referring to the drawing showing embodiment examples.

FIG. 1 shows a first embodiment example of the present invention, wherein to a main lens 1, a lens barrel 2 is attached and to the outer periphery of this barrel a gear 3 is further attached. A rack 4 is so provided that it engages the gear 3, and to this rack 4 a focussing adjustment lever 6 is attached. The focussing adjustment of the main lens is accomplished by the lateral sliding motion of a knob 14 attached to the focussing adjustment lever 6, because this sliding motion causes a revolving motion of the main lens 1 through the rack to pinion action of the gear 3, resulting in a longitudinal shift of the main lens 1 with respect to the focal plane.

Also, on the bottom part 16 of this knob 14, a contact lever 17 having electrical contact points 101 and 102 on both ends is provided. On a contacting board 81, are provided a contact long point 100, which is to be made contact electrically with the contact point 101 and is connected to the positive side of a power supply 22, and contact pins 19, 20, and 21, which are to be made contact electrically with the contact points 102 and are connected to each of light-emitting elements, such as light-emitting diodes or small size incandescent lamps, 7, 8, and 9, respectively. The light-emitting elements 7, 8, and 9 are connected to the negative side of the power supply means 22.

Meanwhile, on the focussing adjustment lever 6 is provided a detent 5, which engages either of indents 11, 12 and 13 provided on the internal wall of a camera body 10. The location of the indents 11, 12, and 13 is for click-stops in a manner that when the detent 5 engages either one of them the contact point 101 electrically contacts with either one of the contact points 19, 20, and 21.

The operation of the FIG. 1 configuration described above will be described in the following.

If the photographing distance is preselected to be three zones, namely, the close distance of about 1 m, the intermediate distance of about 3 m, and the remote distance of such as the landscape, the indents 11, 12, and 13 of the camera body 10 should also be selected so that they correspond those three staged distances. In the case of the close distance, for example, if the focussing adjustment lever 6 is moved, by sliding the knob 14, to the position at which the detent 5 engages the indent 11, then the focussing adjustment of the main lens 1 is to be brought to the completion. In this situation, when the knob 14, which is normally pushed up by a spring, is pressed down by a finger 15, the contact point 101 of the contact lever 17 makes contact with the contact point 100, while the contact point 102 of the contact lever 17 makes contact with the contact point 19. Accordingly, the current flows only through the light-emitting element 7 which is a illumination source for the indication for the close distance, and accordingly the only the indication of the close distance is to be illuminated.

Also for the intermediate and remote distances, the focussing adjustment of the main lens 1 is similarly accomplished by the sliding action of the knob 14 and through the lateral movement of the focussing adjustment lever 6. The recognition of the focussing adjustment for those distance zones is also similarly accomplished by the push-down action of the knob 14 through the illumination of corresponding distance indications by lighting of the corresponding light-emitting element 8 or 9.

Hereupon, if the configuration of the distance indication system is so devised that the illumination of the corresponding numeral or symbolic mark representing the corresponding focussing distance can be viewed inside the finder viewing field, a reliable recognition of distance indication is expected to be attained.

Figures 2A, 2B:
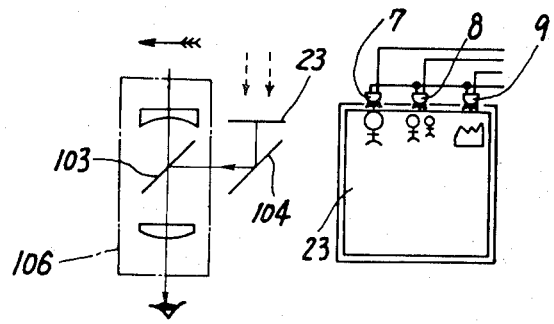
FIG. 2 is a plan view showing a configuration of the distance indicator of the present invention embodied inside a finder mechanism.

FIG. 2(a) shows the configuration example of the abovementioned finder distance indication recognition system, and FIG. 2(b) shows an enlarged front view of an indication plate, which is provided with symbolic marks and the light-emitting elements. A finder 106 comprises mainly a convex lens and a concave lens, and inside the finder 106 a half-mirror 103 is obliquely placed. Near the outside of the finder 106, the indication plate 23 and a reflecting mirror 104 for reflecting symbolic marks in the direction to the half-mirror 103 are also placed as illustrated in FIG. 2(a). The light-emitting elements 7, 8, and 9 are placed close to corresponding the symbolic marks. With this configuration, when the focussing is adjusted, for example, to the close distance zone, the light-emitting element 7 is lit and only the symbolic mark representing the close distance is brightly indicated inside the finder viewing field. Similarly, for the intermediate and remote distance zones, only one that corresponds to the symbolic mark is brightly indicated.

Figure 3:
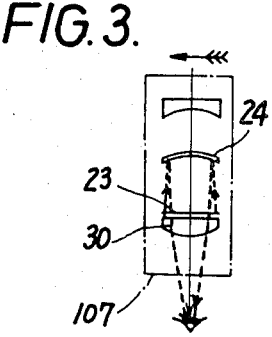
FIG. 3 is a plan view showing another configuration of the distance indicator of the present invention embodied inside another type of finder mechanism.

FIG. 3 shows another example of the finder distance indication recognition system. In FIG. 3, inside a known inverse Galilean type finder 107, the indication plate 23 and the light-emitting elements 7, 8, and 9 for illuminating the symbolic marks are installed closely each other. Further, a bright frame 24, having a reflecting plate, for reflecting the symbolic mark of the indication plate is disposed in the finder 107 in a manner that the symbolic marks are reflected by the reflecting plate and is observed inside the finder viewing field. With this configuration, since image of either one of the symbolic marks illuminated by its corresponding light-emitting element among 7, 8 and 9 is reflected by the reflecting plate of the bright frame 24, it can be observed similarly inside the finder viewing field as in the embodiment example shown in FIG. 2(a).

Figure 4:
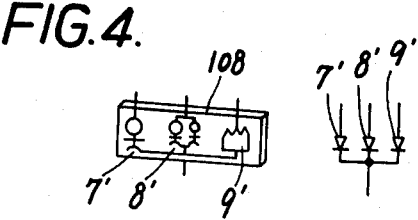
FIG. 4 shows still another embodiment example of a distance indicator in accordance with the present invention.

FIG. 4 is still another example of the present invention, in which symbolic marks are formed with light-emitting elements themselves. This can be accomplished by, for example, the configuration in which light-emitting elements 7', 8' and 9' are formed directly on the indication plate 108 with individual shapes of each symbolic marks by etching with the photolithographic technique. With this configuration, the recognition of the distance indication can be attained with a simpler construction compared with that of the preceding embodiment example.

Figure 8:
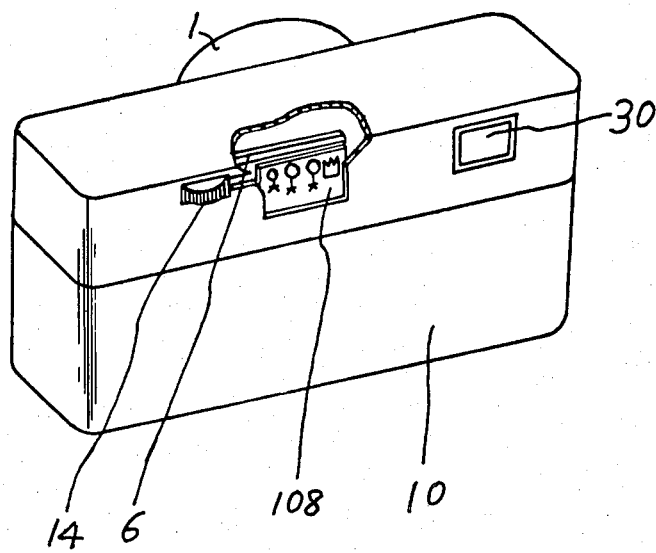
FIG. 8 is a perspective view of another example.

Hereupon, although the embodiment examples of FIG. 2 to FIG. 4 are shown for the case of the finder distance indication recognition system, it is needless to mention that the distance indication recognition is also possible by installing the indication plate 23 or 108 on the outside face of the camera body 10 as shown in FIG. 8.

The first embodiment example of this invention shown by FIG. 1 assures the reliable recognition of the distance indication, but it might has a problem that, depending upon the shape of the knob 14, when the camera is put in a camera case or, in case of a pocket camera, in a pocket of clothing, the bottom part 16 of the knob 14 happens accidentally to be pushed down and the light-emitting element is lit, resulting in unnecessary consumptions of the power supply 22.

Figure 5:
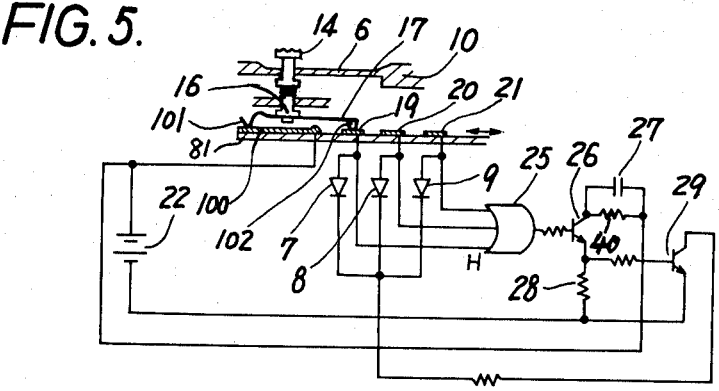
FIG. 5 is a sectional front view of a main part and its associated electrical circuit of the second embodiment example of the distance indicator of the present invention.

FIG. 5 shows a second embodiment example of the distance indicator means according to the present invention with the aim of eliminating the abovementioned problem. In this example, the description on the same construction parts as those of the foregoing embodiment example are omitted and the elements having the same functions as those of the foregoing embodiment example are shown by the same numerals. The focussing adjustment is performed in the same way as in the foregoing embodiment example. When the knob 14 is pressed down, a high-level signal of positive polarity is impressed on an OR-circuit 25 through contact points 100, 101, and 19, for example, from a power supply 22, then the OR-circuit 25 supplies a high-level signal, and consequently a transistor 26 becomes conductive.

Then, a current supplied from the power supply 22 flows for a short time through the transistor 26 and a capacitor 27 parallelly connected to a high resistance collector resistor 40. Then a voltage develops across a resistor 28 which is connected to the emitter of the transistor 29, hence a transistor 29 becomes conductive and then a current flows through a light-emitting element 7 to light it, thus a corresponding numeral or a symbolic mark of the aforementioned indication plate is illuminated brightly.

Hereupon, the current flowing through the capacitor 27, the transistor 26, and the resistor 28 is supplied for a time period corresponding to the time constant which is determined by the capacitor 27 and the resistor 28. That is, the conductive time period of the transistor 26 is determined by the time constant of the capacitor 27 and the resistor 28. After the capacitor 27 is charged up, the transistor 26 is turned into the non-conductive state, and hence the transistor 29 also turns into the non-conductive state. Then the light-emitting element 7 stops to light, that is, the light-emitting element 7 is lit only for a preset time period.

Therefore, even if the knob 14 is accidentally pressed down, after a preset time period determined by the time constant of the capacitor 27 and the resistor 28, the light-emitting element is automatically turned off, and hence the waste of the power supply 22 can be prevented. The resistor 40 is a large resistance resistor for slowly discharging the capacitor 27.

It is needless to mention that, in the case of other focussing adjustment states, the light-emitting element 8 or 9 is also similarly lit and then turned off automatically.

Figure 6:
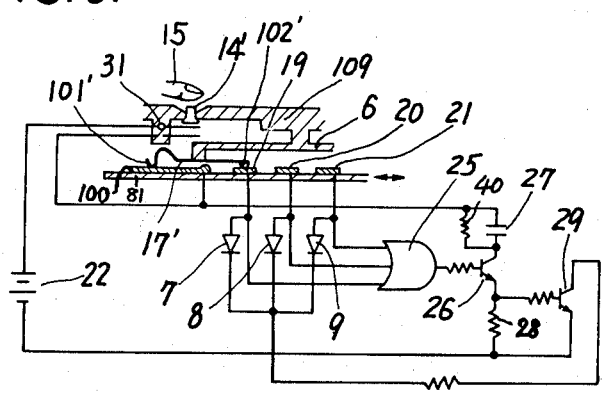
FIG. 6 is a sectional front view of a main part and its associated electric circuit of a third embodiment example of the distance indicator of the present invention.

FIG. 6 shows a third embodiment example of the present invention, wherein a focussing adjustment lever 6 is provided with a part 109, to which a normally-opened switch 31 and a push button 14' for closing the switch 31 are installed. Further, a contact lever 17' is attached to the focussing adjustment lever 6.

In such a construction as stated above, when the focussing adjustment of a main lens, which is not shown in the drawing, is performed by sliding the part 109, a contact point 102' makes contact with either one of contact points 19, 20, and 21. Therefore, at a time when the recognition of the distance indication is desired, by a pressing of the push button 14', the switch 31 closes and either one of light-emitting elements 7, 8, and 9 is lit. Thus the distance indication is accomplished similarly as in the embodiment example shown in FIG. 5.

Figure 7:
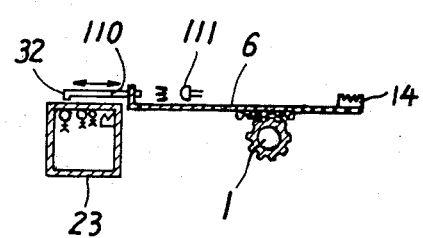
FIG. 7 is a sectional front view of a main part of another embodiment example of the present invention.

FIG. 7 shows still another embodiment example which includes no contact points and uses only one light-emitting element. The construction is such that a glass fiber light conduit rod 110 for guiding and illuminating numerals or symbolic marks representing the distance zones on a indication plate 23 and a light-emitting element 111 such as LED are attached to a focussing adjustment lever 6. In this construction, by sliding the focussing adjustment lever 6, a tip part 32 of the glass fiber 110 moves to the position behind or on either one of the numerals or symbolic marks for indicating distance zones. Then, by putting the light-emitting element 111 on, it emits light which is transmitted to the tip part 32 of the glass fiber 110 and one of the numerals or zone marks corresponding to the relevant distance zone is illuminated brightly. Thus the recognition of the distance indication is accomplished.

Any of the examples of FIGS. 1 to 7 can be combined with the example of FIG. 8.

What is claimed is:

1. A distance indicator for a photographic camera having a shutter releasing mechanism comprising:
   an indication plate provided with plural distance marks representing distances to an object being photographed,
   plural light-emitting means for illuminating corresponding ones of said plural distance marks,
   a power supply means for supplying electric current to said plural light-emitting means, and
   a switching means for selectively feeding current from said power supply means to said light-emitting means,
   the switching means being linked with a focusing adjustment means of a main lens and operable independently of said shutter releasing mechanism, wherein said switching means is connected between said power supply means and said light-emitting means for normally stopping current supply from said power supply means to said plural light-emitting means, and
   said switching means contains a current supply control means for controlling the current to selectively illuminate said plural distance marks in response to actuation of a knob for adjusting said focusing adjustment means.

2. An apparatus according to claim 1, wherein said indication plate is installed within a finder for observing said objects therethrough.

3. An apparatus according to claim 1, wherein said indication plate is positioned near a finder for observing said objects therethrough and for simultaneously observing said distance marks inside the field of view of the finder and wherein said apparatus further comprises:
   a mirror for reflecting an image of said distance marks to said finder, said mirror being provided near to and outside said finder, and a half-mirror within said finder for combining said reflected image with an image of an object being observed.

4. An apparatus according to claim 1, wherein said indication plate is exposed from a body of said photographic camera.

5. An apparatus according to claim 1, wherein said light-emitting means comprises:
   plural light-emitting elements disposed adjacent said plural distance marks on said indication plate and said switching means comprises:
   a plurality of contact points each of which is connected to a respective one of said light-emitting elements,
   an additional single contact point connected to one terminal of said power supply means, and
   two linked slidably movable contact points, one of which engages said single contact point and the other being movable to engage respective ones of said plural contact points, the slidably movable contact points being linked with said focusing adjustment means of the main lens and a connecting means which electrically connects said two linked contact points to each other, wherein
   said current supply control means comprises a supporting material for said slidably movable contact points, and wherein
   a spring material is disposed at said supporting material to make contact between said slidably movable contact points, one of said plural contact points and said single contact point.

6. An apparatus according to claim 1, wherein said light-emitting means comprises plural light-emitting elements disposed adjacent to corresponding ones of said plural distance marks on said indication plate, and
   said switching means comprises:
   a plurality of contact points each of which is connected to a respective one of said light-emitting elements, an additional single contact point connected to one terminal of said power supply means and two linked slidably movable contact points, one of which engages said single contact point and the other being movable to engage respective ones of said plural contact points, the slidably movable contact points being linked with said focusing adjustment means of the main lens, a connecting means which electrically connects said two-linked contact points to each other, wherein
   said current supply control means comprises a time-switching circuit which includes transistors and a time constant circuit which allows the current to flow through one of said light-emitting elements for a preset time period determined by the time constant of said time constant circuit and which then automatically stops the current flow.

7. An apparatus of claim 1, wherein said light-emitting means comprises:
   plural light-emitting elements disposed adjacent to corresponding ones of said plural distance marks on said indication plate, and
   said switching means comprises:
   a plurality of contact points each of which is connected to a respective one of said light-emitting elements, an additional single contact point connected to one terminal of said power supply through a normally-opened switch, two linked slidably movable contact points one of which engages said single contact point and the other being movable to engage respective ones of said plural contact points, the slidably movable contact points being linked with said focusing adjustment means of the main lens, and
   a connecting means which electrically connects said two linked contact points to each other, wherein
   said current supply control means comprises a time-switching circuit which includes transistors and a time constant circuit for stopping said current after a preset time period determined by the time constant of said time constant circuit.

8. An apparatus according to claim 1, wherein said light-emitting means comprises:
   a light-emitting element which is attached to said focusing adjustment means and which is supplied current from said power supply means, and
   means for guiding light emitted from said light-emitting element to a selected one of said plural distance marks.

9. A distance indicator for a photographic camera comprising:
an indication plate provided with plural distance indicating marks adapted to be lit in accordance with electric excitations corresponding to plural distance zones to an object being photographed,
a switching means for selectively lighting one of the distance indicating marks corresponding to the focusing adjustment of a main lens of said camera, and
a power supply which supplies electrical energy to said plural distance indicating marks through said switching means, wherein
said switching means is connected between said power supply means and said light-emitting means for normally stopping current supply from said power supply means to said plural light-emitting means, and
said switching means contains a current supply control means for controlling the current to selectively illuminate said plural distance marks in response to actuation of a knob for adjusting said focusing adjustment means.

10. An apparatus according to claim 9, wherein said indication plate is installed within a finder through which the object being photographed is observed.

11. An apparatus according to claim 9, wherein said indication plate is disposed adjacent to and outside said finder, and wherein said apparatus further includes a half-mirror and a mirror which reflects an image of said indication plate to said half-mirror which superimposes the reflected image onto an image of an object observed through said finder.

12. An apparatus according to claim 9, wherein said indication plate is disposed so as to be observed from outside said photographic camera.

13. An apparatus according to claim 9, wherein said switching means comprises:
a plurality of contact points each of which is selectively connected to a respective one of plural light-emitting elements by means linked to the focusing adjustment of said main lens, said linked means including:
a single contact point connected to one terminal of said power supply and
a connecting means which electrically connects said selected one of the plural contact points to said single contact point.

14. An apparatus according to claim 9, wherein said switching means comprises:
a plurality of contact points each of which is selectively connected to a respective one of plural light-emitting elements,
a single contact point connected to one terminal of said power supply,
two linked slidably movable contact points one of which engages said single contact point and the other being movable to engage respective ones of said plural contact points, the slidably movable contact points being linked to said focusing adjustment means of the main lens, and
a connecting means which electrically connects said two linked contact points to each other wherein said current supply control means comprises a time-switching circuit which includes transistors and a time constant circuit which allows the current to flow through one of said light-emitting elements for a preset time period determined by the time constant of said time constant circuit and which then automatically acts to stop the current.

15. An apparatus according to claim 9, wherein said switching means comprises:
a plurality of contact points each of which is selectively connected to a respective one of plural light-emitting elements,
a single contact point connected to one terminal of said power supply through a normally-open switch, and
two linked slidably movable contact points one of which engages said single contact point and the other being movable to engage respective ones of said plural contact points, the slidably movable contact points being linked to said focusing adjustment means to form a member which links and connects said two slidably movable contact points to move in united and electrically connected relationship, and means for connecting said plural light-emitting elements to another terminal of said power supply means through said normally open switch and also through a time-switching circuit, wherein
said current supply control means comprises said time-switching circuit which includes transistors and a time constant circuit for causing said current to stop after a preset time period determined by the time constant of said time constant circuit.

16. A distance indicator for a photographic camera having a shutter releasing mechanism comprising:
an indication plate provided with plural distance marks representing distances to an object being photographed,
plural light-emitting means for illuminating corresponding ones of said plural distance marks,
a power supply means for supply electric current to said plural light-emitting means, and
a switching means for selectively feeding current from said power supply means to said light-emitting means,
the switching means being linked with a focusing adjustment means of a main lens and operable independently of said shutter releasing mechanism, wherein
said light-emitting means comprises plural light-emitting elements disposed adjacent corresponding ones of said plural distance marks on said indication plate, and
said switching means comprises:
a plurality of contact points each of which is connected to a respective one of said light-emitting elements, an additional single contact point connected to one terminal of said power supply means and two linked slidably movable contact points, one of which engages said single contact point and the other being movable to engage respective ones of said plural contact points, the slidably movable contact points being linked with said focusing adjustment means of the main lens, a connecting means which electrically connects said two-linked contact points to each other, and means for connecting said plural light-emitting elements to another terminal of said power supply means through a time-switching circuit which includes transistors and a time constant circuit which allows the current to flow through one of said light-emitting elements for a preset time period determined by the time constant of said time constant circuit and which then automatically stops the current flow.

17. A distance indicator for a photographic camera having a shutter releasing mechanism comprising:
an indication plate provided with plural distance marks representing distances to an object being photographed,
plural light-emitting means for illuminating corresponding ones of said plural distance marks,
a power supply means for supplying electric current to said plural light-emitting means, and
a switching means for selectively feeding current from said power supply means to said light-emitting means,
the switching means being linked with a focusing adjustment means of a main lens and operable independently of said shutter releasing mechanism, wherein
said light-emitting means comprises:
plural light-emitting elements disposed adjacent corresponding ones of said plural distance marks on said indication plate, and
said switching means comprises:
a plurality of contact points each of which is connected to a respective one of said light-emitting elements, an additional single contact point connected to one terminal of said power supply through a normally-opened switch, two linked slidably movable contact points one of which engages said single contact point and the other being movable to engage respective ones of said plural contact points, the slidably movable contact points being linked with said focusing adjustment means of the main lens,
a connecting means which electrically connects said two linked contact points to each other, and
means for connecting said plural light-emitting elements to another terminal of said power supply through said normally-opened switch and also through a time-switching circuit which includes transistors and a time constant circuit for stopping said current after a preset time period determined by the time constant of said time constant circuit.

18. A distance indicator for a photographic camera comprising:
an indication plate provided with plural distance indicating marks adapted to be lit in accordance with electric excitations corresponding to plural distance zones to an object being photographed,
a switching means for selectively lighting one of the distance indicating marks corresponding to the focusing adjustment of a main lens of said camera, and
a power supply which supplies electrical energy to said plural distance indicating marks through said switching means, wherein
said switching means comprises:

a plurality of contact points each of which is selectively connected to a respective one of plural light-emitting elements,
a single contact point connected to one terminal of said power supply,
two linked slidably movable contact points one of which engages said single contact point and the other being movable to engage respective ones of said plural contact points, the slidably movable contact points being linked to said focusing adjustment means of the main lens, and
a connecting means which electrically connects said two linked contact points to each other and means for connecting said plural light-emitting elements to another terminal of said power supply through a time-switching circuit which includes transistors and a time constant circuit which allows the current to flow through one of said light-emitting elements for a preset time period determined by the time constant of said time constant circuit and which then automatically acts to stop the current.

19. A distance indicator for a photographic camera comprising:
an indication plate provided with plural distance indicating marks adapted to be lit in accordance with electric excitations corresponding to plural distance zones to an object being photographed,
a switching means for selectively lighting one of the distance indicating marks corresponding to the focusing adjustment of a main lens of said camera, and
a power supply which supplies electrical energy to said plural distance indicating marks through said switching means, wherein,
said switching means comprises:
a plurality of contact points each of which is selectively connected to a respective one of plural light-emitting elements,
a single contact point connected to one terminal of said power supply through a normally-open switch, and
two linked slidably movable contact points one of which engages said single contact point and the other being movable to engage respective ones of said plural contact points, the slidably movable contact points being linked to said focusing adjustment means to form a member which links and connects said two slidably movable contact points to move in united and electrically connected relationship, and means for connecting said plural light-emitting elements to another terminal of said power supply means through said normally open switch and also through a time-switching circuit which includes transistors and a time constant circuit for causing said current to stop after a preset time period determined by the time constant of said time constant circuit.

* * * * *